(12) United States Patent
Cheng et al.

(10) Patent No.: US 11,872,608 B2
(45) Date of Patent: Jan. 16, 2024

(54) METHOD OF REMOVING SLUDGE FROM A DRAIN PIPE

(71) Applicants: Kuo-Chung Cheng, Kaohsiung (TW); Mei-Liang Cheng, Kaohsiung (TW)

(72) Inventors: Kuo-Chung Cheng, Kaohsiung (TW); Mei-Liang Cheng, Kaohsiung (TW)

(*) Notice: Subject to any disclaimer, the term of this patent is extended or adjusted under 35 U.S.C. 154(b) by 876 days.

(21) Appl. No.: 16/734,940

(22) Filed: Jan. 6, 2020

(65) Prior Publication Data
US 2021/0205862 A1  Jul. 8, 2021

(51) Int. Cl.
*B08B 9/045* (2006.01)
*C02F 11/00* (2006.01)

(52) U.S. Cl.
CPC .............. *B08B 9/045* (2013.01); *C02F 11/00* (2013.01); *C02F 2201/002* (2013.01)

(58) Field of Classification Search
None
See application file for complete search history.

(56) References Cited

U.S. PATENT DOCUMENTS

| | | | | |
|---|---|---|---|---|
| 326,544 A * | 9/1885 | Case | ................... | F16L 1/165 405/158 |
| 2,250,671 A * | 7/1941 | Joy | ................... | E21B 7/005 175/404 |
| 2,278,026 A * | 3/1942 | Smith | ................... | E03F 9/002 15/104.31 |
| 3,380,461 A * | 4/1968 | Maasberg | ................... | F28G 1/16 134/167 C |
| 4,122,012 A * | 10/1978 | Vlasnik | ................... | C02F 1/004 210/170.11 |
| 4,361,282 A * | 11/1982 | DiVito | ................... | B05B 1/3405 134/22.12 |
| 4,465,400 A * | 8/1984 | Adams | ................... | F16L 1/161 405/169 |
| 4,596,493 A * | 6/1986 | Tisdale | ................... | E02F 5/107 405/74 |
| 4,808,305 A * | 2/1989 | Arnold | ................... | B01F 35/7178 239/533.13 |
| 5,360,488 A * | 11/1994 | Hieatt | ................... | C11D 7/08 134/22.12 |

(Continued)

*Primary Examiner* — Robert J Popovics
(74) *Attorney, Agent, or Firm* — BACON & THOMAS, PLLC (57) ABSTRACT

A method of removing sludge from a drain pipe used for cleaning a drain pipe comprises a piling step, a platform setting step, a drilling path planning step, a coil deploying step, a conveying bracket lifting step, a guiding step, a drilling step, and a cleaning step. In the piling step, a plurality of supporting columns are provided around the opening of the drain pipe. In the platform setting step, a work platform is provided on the plurality of supporting columns. In the drilling path planning step, a drilling path is planned. In the coil deploying step, an induction coil group is placed above the drain pipe. In the conveying bracket lifting step, a conveying bracket is hung by lifting equipment so that the conveying bracket is aligned with the opening of the drain pipe. In the guiding step, the drill bit is guided to the opening of the drain pipe using the conveying bracket. In the drilling step, the drill bit is controlled to drill into the clogged bulk in the drain pipe. In the cleaning step, the waste generated by drilling is cleaned.

10 Claims, 14 Drawing Sheets

(56) References Cited

U.S. PATENT DOCUMENTS

| | | | | |
|---|---|---|---|---|
| 5,893,978 | A * | 4/1999 | Yoda | C02F 7/00 |
| | | | | 405/63 |
| 5,915,395 | A * | 6/1999 | Smith | B08B 9/032 |
| | | | | 134/22.12 |
| 6,117,336 | A * | 9/2000 | Sachse | E02B 15/06 |
| | | | | 210/776 |
| 6,346,193 | B1 * | 2/2002 | Bauer | E02B 15/08 |
| | | | | 210/170.03 |
| 6,458,214 | B1 * | 10/2002 | Kanda | E03C 1/30 |
| | | | | 134/22.12 |
| 6,484,736 | B1 * | 11/2002 | Kanda | E03C 1/30 |
| | | | | 134/169 C |
| 6,627,089 | B1 * | 9/2003 | Wilkinson | B08B 9/0325 |
| | | | | 134/22.12 |
| 7,472,501 | B2 * | 1/2009 | Cheramie | E02B 3/18 |
| | | | | 405/74 |
| 7,485,235 | B2 * | 2/2009 | Kellett | B63B 35/32 |
| | | | | 210/776 |
| 8,505,146 | B1 * | 8/2013 | Jessup | B08B 9/045 |
| | | | | 15/104.03 |
| 9,399,910 | B2 * | 7/2016 | Sooy | E21B 47/002 |
| 9,828,758 | B2 * | 11/2017 | Johnsen | F16K 1/14 |
| 9,962,746 | B2 * | 5/2018 | Bauer | B05B 3/00 |
| 2002/0139399 | A1 * | 10/2002 | Kanda | E03B 7/006 |
| | | | | 134/22.12 |
| 2007/0158253 | A1 * | 7/2007 | Kellett | E02B 15/104 |
| | | | | 210/776 |
| 2008/0149140 | A1 * | 6/2008 | Ono | B08B 9/0325 |
| | | | | 134/21 |
| 2016/0129486 | A1 * | 5/2016 | Bauer | H04N 23/54 |
| | | | | 134/167 C |
| 2016/0348351 | A1 * | 12/2016 | Johnsen | E03F 1/00 |

* cited by examiner

METHOD OF REMOVING SLUDGE FROM A DRAIN PIPE

BACKGROUND OF THE INVENTION

1. Field of the Invention

The present invention relates to a method of removing sludge, more particularly to a method of removing sludge from a drain pipe.

2. Description of the Prior Art

The wastewater source is mainly produced by household activity, manufacturing and industry. When the wastewater is discharged into the environment, the wastewater is treated to remove the solid components, organic pollutants, or some chemical pollutants. Therefore, the wastewater will be delivered to a sewage treatment plant by a special water channel, in which the wastewater will be processed and is converted into an effluent that can be returned to the water cycle with minimum impact on the environment.

Figure 1:
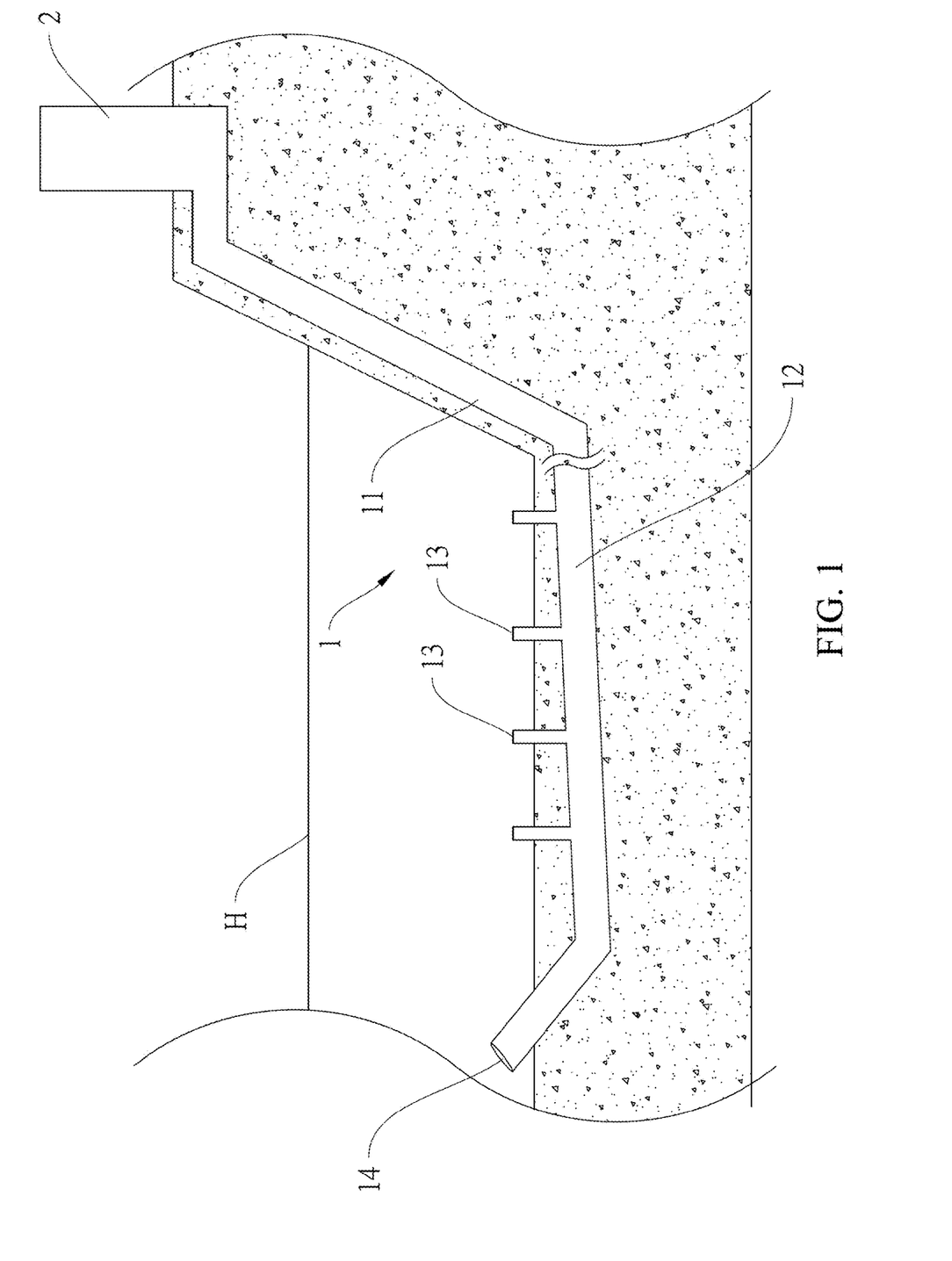
FIG. 1 is a schematic side view illustrating an arrangement of a submerged drain pipe.

Refer to FIG. 1, a submerged drain pipe 1 is disposed below the water surface H, and includes a conveying pipe 11 connected to a sewage treatment plant 2, a distributing pipe 12 connected to the conveying pipe 11 and extended to the underwater ground, and a plurality of standpipes 13 disposed on the distributing pipe 12 at intervals and exposed on the underwater ground. The end of the distributing pipe 12 inclines upwardly to be exposed on the underwater ground and is provided with an opening 14.

Although the drain pipe 1 can discharge the water treated by the sewage treatment plant 2 into the ocean or river, after long-term use, objects are easy to attach to the inner wall of the conveying pipe 11 and the distributing pipe 12 of the drain pipe 1, and will affect the drainage volume. Sediments also are easy to accumulate from the opening 14 of the distributing pipe 12, and result in a clogged drain pipe 1. When the clogged area is expanded, it will cause poor drainage.

Therefore, it is desirable to provide a method to remove the clogged bulk in a drain pipe.

SUMMARY OF THE INVENTION

Therefore, an objective of an embodiment of the present invention is to provide a method of removing sludge from a drain pipe used for cleaning a drain pipe. The drain pipe includes a conveying pipe connected to a sewage treatment plant, a distributing pipe connected to the conveying pipe and extended to the underwater ground, and a plurality of standpipes disposed on the distributing pipe at intervals. The end of the distributing pipe inclines upwardly to be exposed on the underwater ground and is provided with an opening. The method of removing sludge from a drain pipe comprises a piling step, a platform setting step, a drilling path planning step, a coil deploying step, a conveying bracket lifting step, a guiding step, a drilling step, and a cleaning step.

In the piling step, a plurality of supporting columns are built in the water area near the opening of the distributing pipe, and the plurality of supporting columns encircles the water area near the opening of the distributing pipe.

In the platform setting step, the top of the supporting columns is higher than the water level, so that a work platform is able to be built above the water surface, and a drilling equipment is disposed on the work platform.

In the drilling path planning step, a drilling path is planned based on the design of the drain pipe, so that a drilling angle, drilling distance, drilling depth, drilling curvature, and the drilling length of the drilling target are able to be obtained.

In the coil deploying step, based on the design of the drain pipe, an induction coil assembly is laid above the drain pipe by a diver or deepwater deployment equipment.

In the conveying bracket lifting step, two pieces of lifting equipment are disposed on the work platform at intervals. The two pieces of lifting equipment respectively hang one end of a conveying bracket, and works together to lower the conveying bracket into the water, so that the tilt direction and angle of the conveying bracket are aligned with the ends of the distributing pipe.

In the guiding step, a drill bit is guided by the drilling equipment from the work platform to the opening at the end of the underwater distributing pipe using the conveying bracket, and each time when the drill bit moves forward a determined distance, a piece of drill pipe is connected to the rear of the drill bit.

In the drilling step, the position of the drill bit is detected by the induction coil assembly, so that the drill bit controlled by the drilling equipment is able to drill from the opening at the end of the distributing pipe in a direction toward the conveying pipe based on the drilling path.

In the cleaning step, the waste generated by drilling is cleaned up.

Another technique of an embodiment of the present invention is that in the piling step, the plurality of supporting columns may be encircled by a netting to define a work area in the aforementioned water area.

Another technique of an embodiment of the present invention is that in the drilling step, the waste generated by drilling flows out from the opening at the end of the distributing pipe, and in the cleaning step, the waste is confined in the work area by the netting.

Another technique of an embodiment of the present invention is that in the cleaning step, the floating waste is removed from the work area.

Another technique of an embodiment of the present invention is that in the drilling step, a measuring and detecting transmitting device is provided in the drill pipe connected to the drill bit. The induction coil assembly produces an artificial magnetic field. The measuring and detecting transmitting device detects the artificial magnetic field and the geomagnetic field, and transmits the detected data.

Another technique of an embodiment of the present invention is that in the drilling step, a drilling position calculation device is provided on the work platform, and the drilling position calculation device receives data transmitted by the measuring and detecting transmitting device, so that the position of the drill bit and the drill pipes is able to be calculated.

Another technique of an embodiment of the present invention is that in the guiding step, a reamer may be provided between two adjacent drill pipes, and in the drilling step, the reamer following the drill bit expands the drilling hole diameter.

Another technique of an embodiment of the present invention is that in the drilling step, the diameter of the reamer is larger than the diameter of the drill pipe and the drill bit, and the reamer is provided with a plurality of drill points to expand the drilling hole diameter when spinning.

Another technique of an embodiment of the present invention is that in the drilling step, the drill pipes are hollow used to deliver water or solvent from the work platform to the reamer, and the reamer is provided with a plurality of outlets, so that water or solvent is ejected from the plurality of outlets to soften the clogged bulk in the distributing pipe.

Another technique of an embodiment of the present invention is that in the drilling step, the position of the drill bit and drill pipes is obtained by the induction coil assembly, the measuring and detecting transmitting device, and the drilling position calculation device using the horizontal direction drilling (HDD).

The advantage of the embodiments in this present invention is that by means of the induction coil assembly, the measuring and detecting transmitting device and the drilling position calculation device, an operator of the drilling equipment can obtain the positions of the drill bit and drill pipes, so that the drill bit is controlled to move forward in the drain pipe, and is prevented from damaging the pipe wall of the drain pipe. Furthermore, the netting can confine the waste in the work area to avoid polluting the sea or river, and facilitate the removal of waste.

DETAILED DESCRIPTION OF THE PREFERRED EMBODIMENTS

Specific structural and functional details disclosed herein will become apparent from the following description of the three preferred embodiments of the present invention taken in conjunction with the accompanying drawings, which provides better understanding to a person having ordinary skill in the art but shall not be construed as limiting the invention. Wherever possible, the same reference numbers are used in the drawings and the description to refer to the same or like parts.

Figure 2:
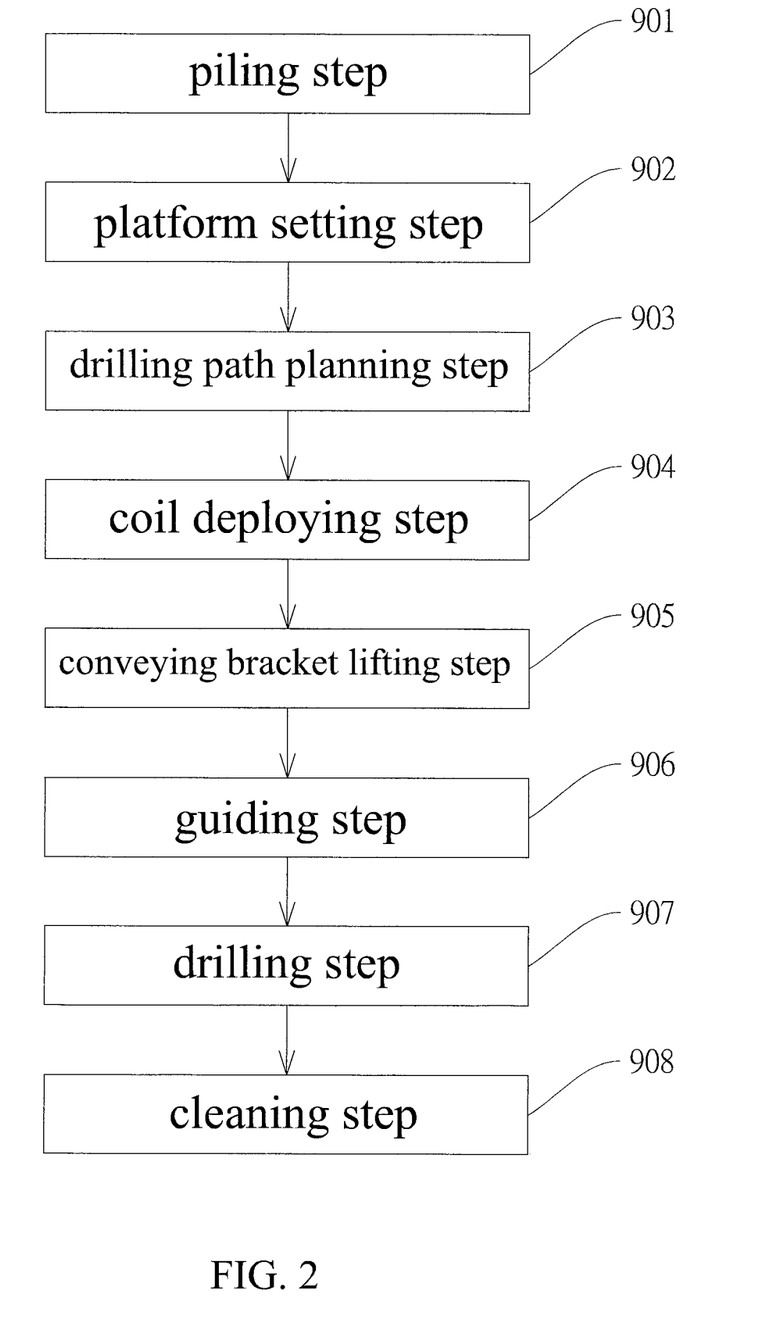
FIG. 2 is a flow chart according to a first preferred embodiment of the present invention.

Please refer to FIG. 2, a first preferred embodiment of a method of removing sludge from a drain pipe, comprises a piling step 901, a platform setting step 902, a drilling path planning step 903, a coil deploying step 904, a conveying bracket lifting step 905, a guiding step 906, a drilling step 907, and a cleaning step 908.

The method of removing sludge is used for cleaning a drain pipe 1. The drain pipe 1 includes a conveying pipe 11 connected to a sewage treatment plant 2, a distributing pipe 12 connected to the conveying pipe 11 and extended to the underwater ground, and a plurality of standpipes 13 disposed on the distributing pipe 12 at intervals. The end of the distributing pipe 12 inclines upwardly to be exposed on the underwater ground and is provided with an opening 14.

Figure 3:
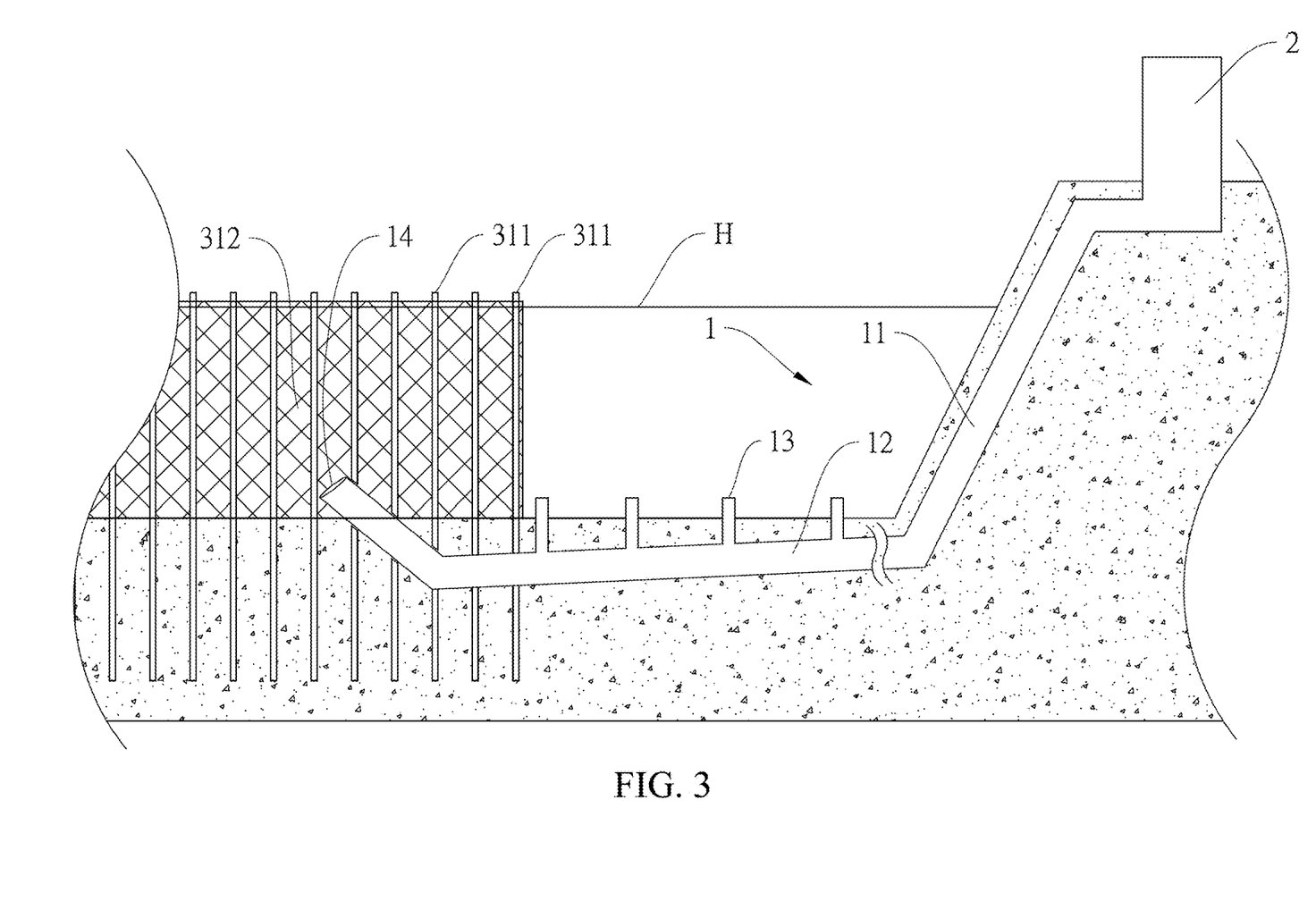
FIG. 3 is a schematic side view illustrating that a plurality of support columns are provided near an opening of a distributing pipe of the drain pipe in a piling step.
Figure 4:
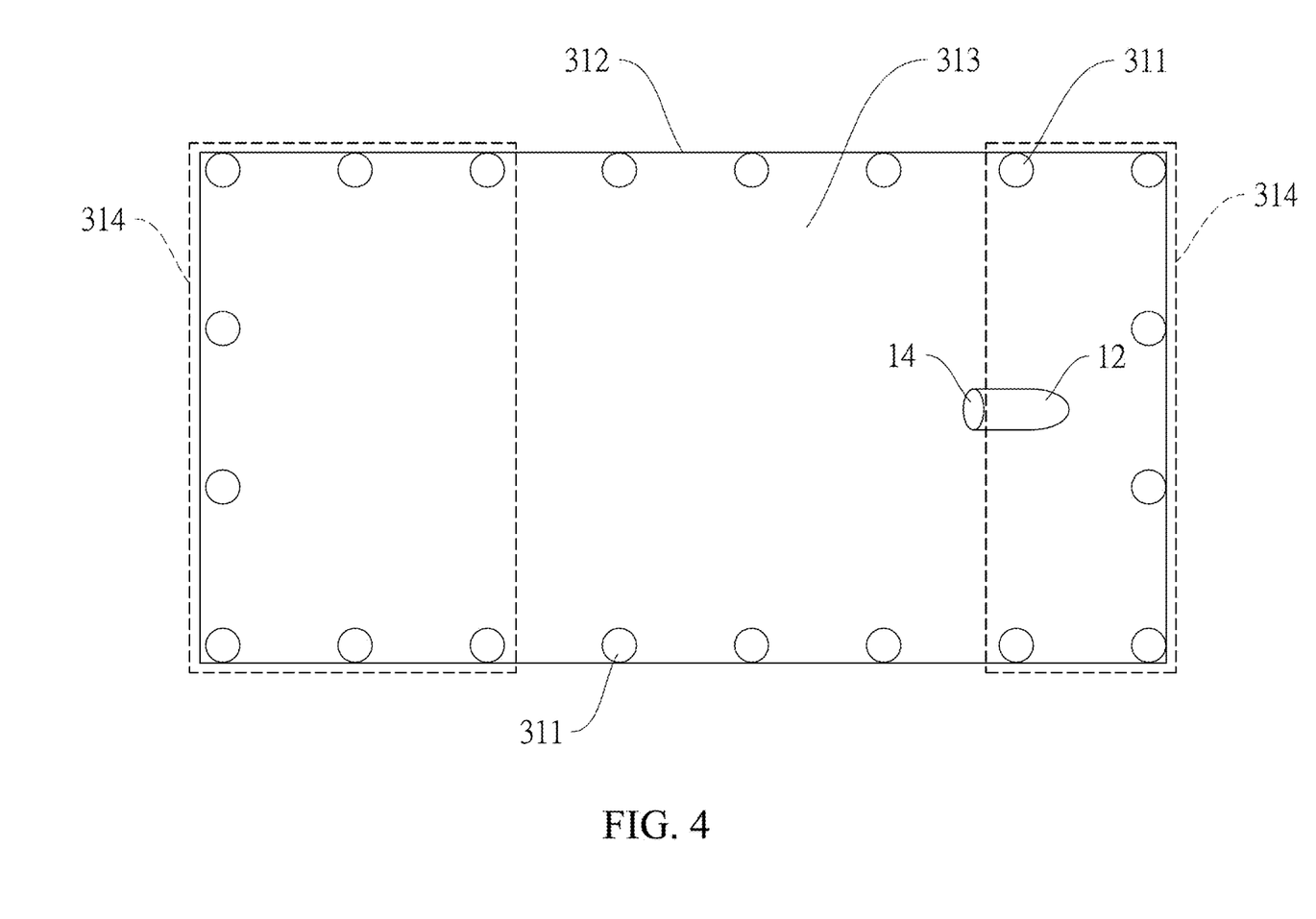
FIG. 4 is a schematic top view illustrating that a netting is provided on the support columns near the opening of the distributing pipe in the piling step.

Please refer to FIGS. 3 and 4, in the piling step 901, a plurality of supporting columns 311 are built in the water area near the opening 14 of the distributing pipe 12, and the plurality of supporting columns 311 encircles the water area near the opening 14 of the distributing pipe 12. The plurality of supporting columns 311 may be encircled by a netting 312 to define a work area 313 in the aforementioned water area, and the position of the netting 312 is higher than the water surface to encircle the floating waste 4.

Figure 5:
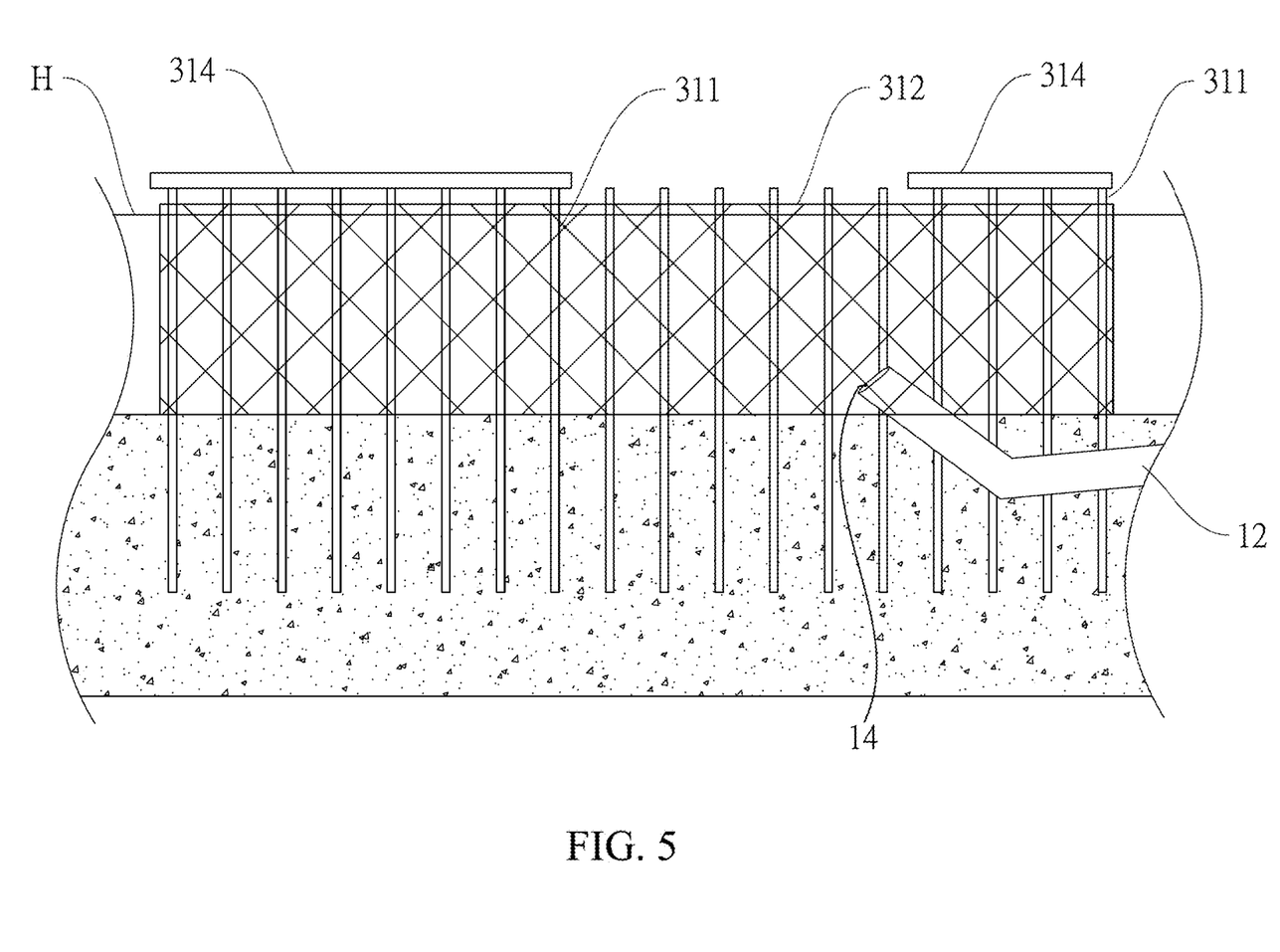
FIG. 5 is a schematic side view illustrating that a work platform built on top of the plurality of supporting columns in a platform setting step.
Figure 6:
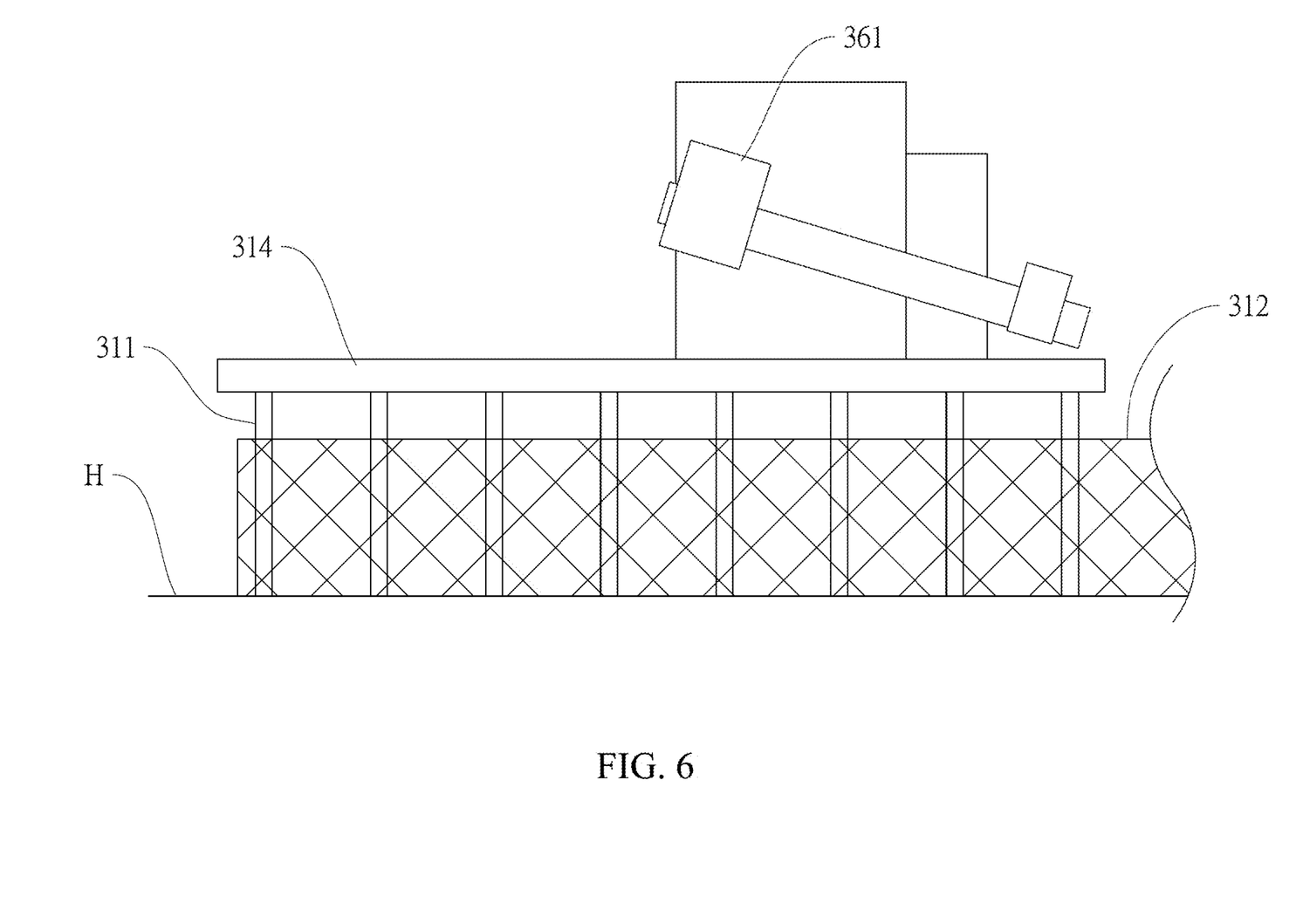
FIG. 6 is a schematic side view illustrating that a drilling equipment is disposed on the work platform.

Please refer to FIGS. 5 and 6, in the platform setting step 902, the top of the plurality of support columns 311 is higher than the water surface, so that a work platform 314 is built above the water surface. After the work platform 314 is completed, a dredging equipment such as a drilling equipment 361, two pieces of lifting equipment 331, a drill bit 351, and a plurality of drill rods 352 may be transported to the work platform 314. The work platform 314 is located away from the water area above the opening 14 of the distributing pipe 12, that is, a working shaft is disposed on the work platform 314 above the distributing pipe 12, which facilitates the underwater operations. In FIG. 4, the work platform 314 provided above the plurality of support columns 311 is indicated by a dotted line.

In the drilling path planning step 903, a drilling path is planned based on the design of the drain pipe 1, so that a drilling angle, drilling distance, drilling depth, drilling curvature and drilling length of the drilling target are able to be obtained. Furthermore, based on the drilling angle, working with the drilling straight line section (down straight line section) or curved line section (upward curve line section), the drilling path passes through the conveying bracket 341 and enters into the distributing pipe 12.

Figure 7:
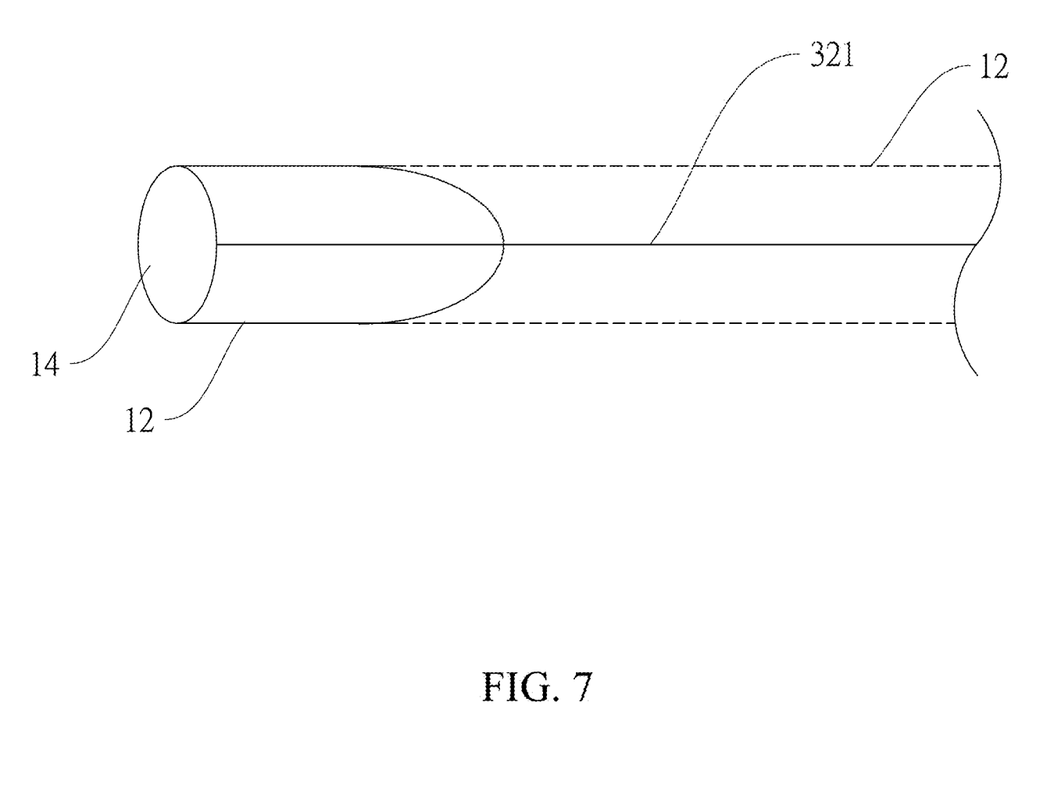
FIG. 7 is a schematic top view illustrating that an induction coil assembly is disposed above the distributing pipe of the drain pipe in a coil deploying step.

Please refer to FIG. 7, in the coil deploying step 904, based on the design of the drain pipe 1, an induction coil assembly is laid on the underwater ground above the longitudinal direction of distributing pipe 12 of the drain pipe 1 by a diver or deepwater deployment equipment. In FIG. 7, where the distributing pipe 12 buried under the underwater ground is indicated by a dotted line. The induction coil assembly 321 is disposed on the underwater ground above the drain pipe 1. In actual implementation, the induction coil assembly 321 may be deployed by other means, and shall not be construed as limiting the invention. When deploying the induction coil assembly 321 in the water area with shallow depths or insignificant currents, divers can be dispatched to deploy the induction coil assembly 321. When in the water area with deep depths or extreme currents, deepwater deployment equipment such as unmanned submarines can be used instead.

Figure 8:
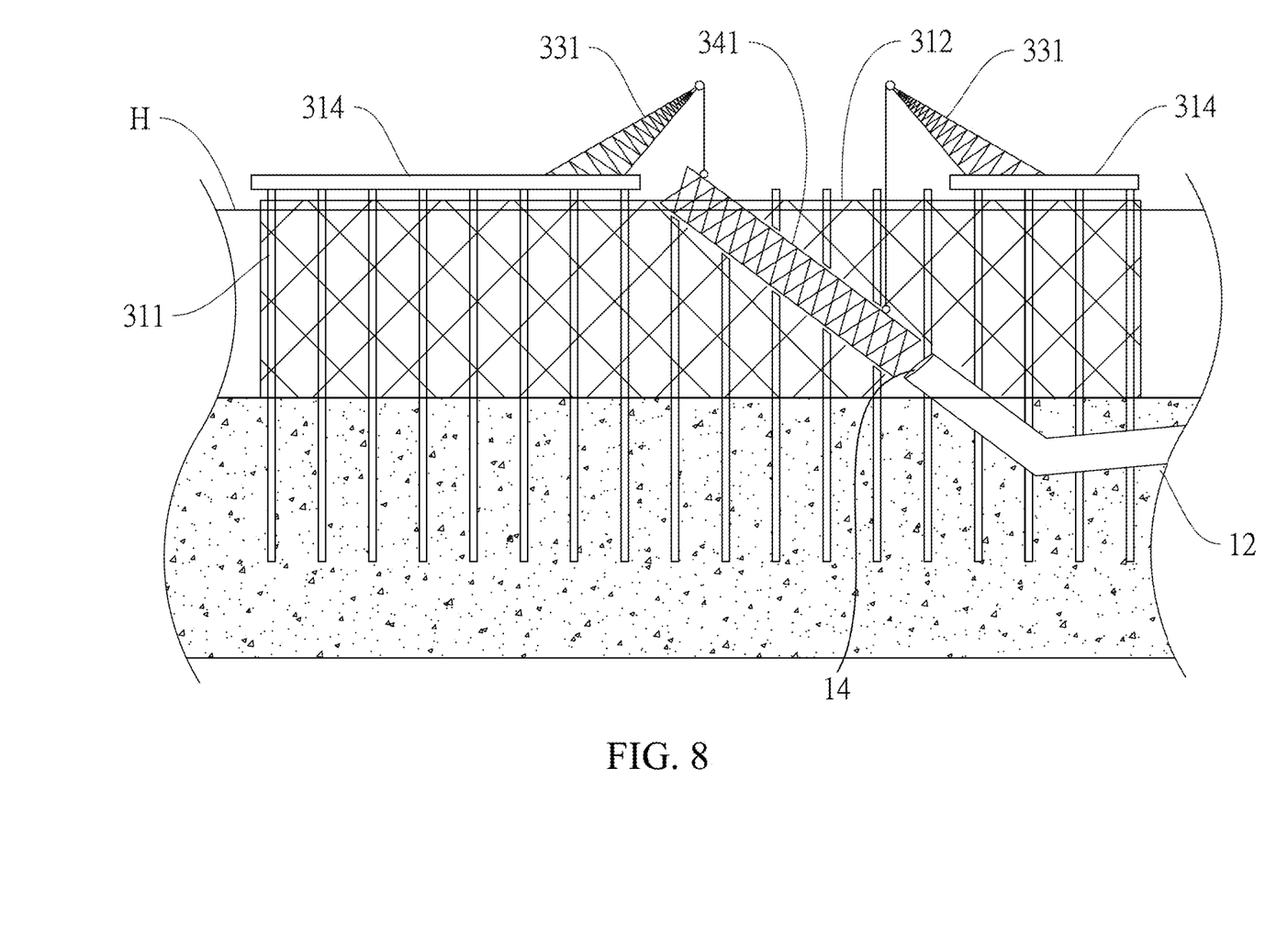
FIG. 8 is a schematic side view illustrating that two pieces of lifting device hang a conveying bracket in a conveying bracket lifting step.

Please refer to FIG. 8, in the conveying bracket lifting step 905, two pieces of lifting equipment 331 are disposed on the work platform 314 at intervals. The two pieces of lifting equipment 331 respectively hang one end of a conveying bracket 341, and works together to lower the conveying bracket 341 into the water, so that the tilt direction and angle of the conveying bracket 341 are aligned with the ends of the distributing pipe 12.

Figure 9:
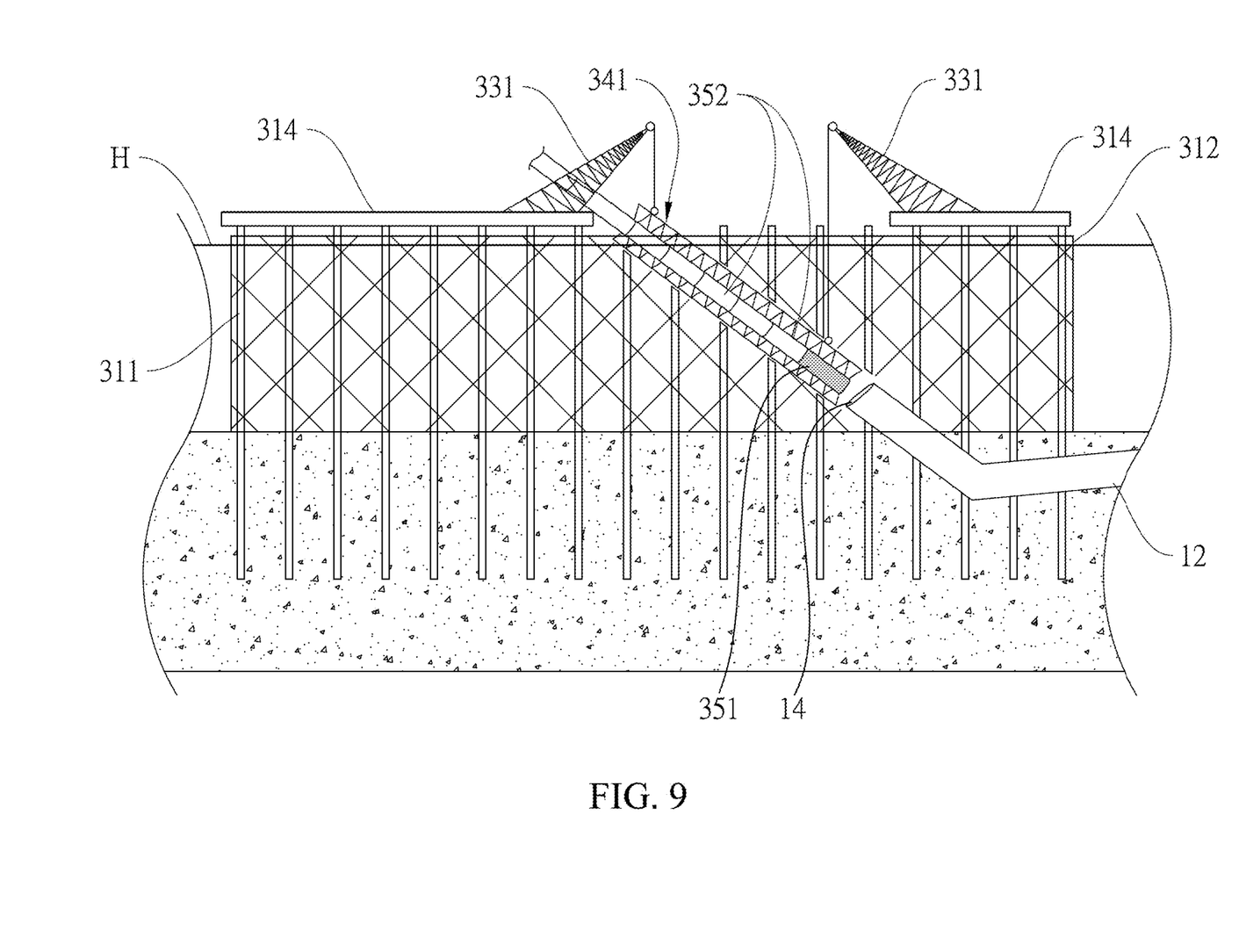
FIG. 9 is a schematic side view illustrating that the conveying bracket guides a drill bit and a plurality of drill pipes connected in series to the opening of the distributing pipe of the drain pipe in a guiding step.
Figure 12:
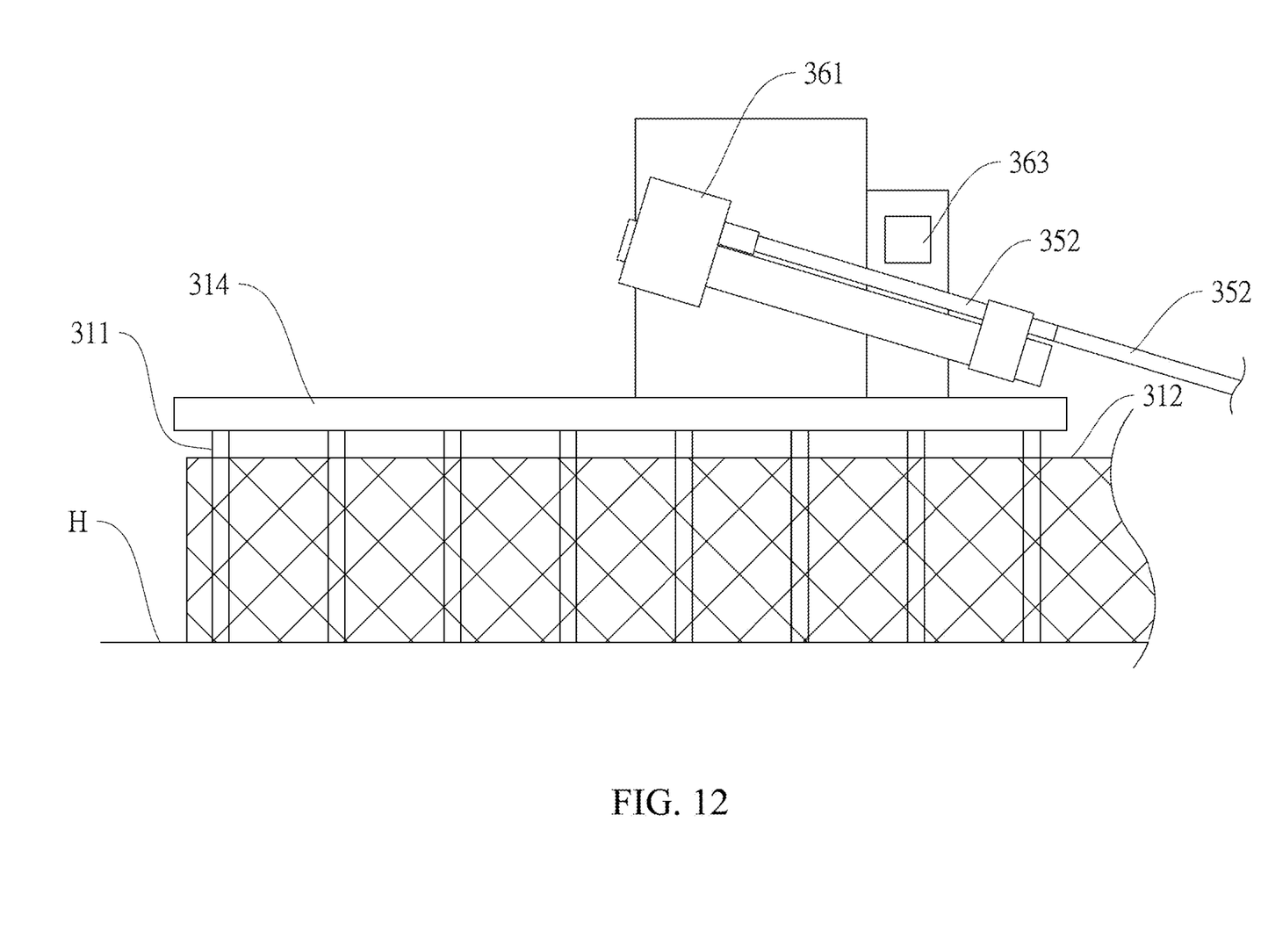
FIG. 12 is schematic side view illustrating that the drilling equipment drives a plurality of drill pipes to spin in a drilling step.

Please refer to FIGS. 9 and 12, in the guiding step 906, a drill bit 351 is guided by the drilling equipment 361 from the work platform 314 to the opening 14 at the end of the underwater distributing pipe 12 using the conveying bracket 341, and each time when the drill bit 351 moves forward a determined distance, a piece of drill pipe 352 is connected to the rear of the drill bit 351. The drill bit 351 is moved by push.

Figure 10:
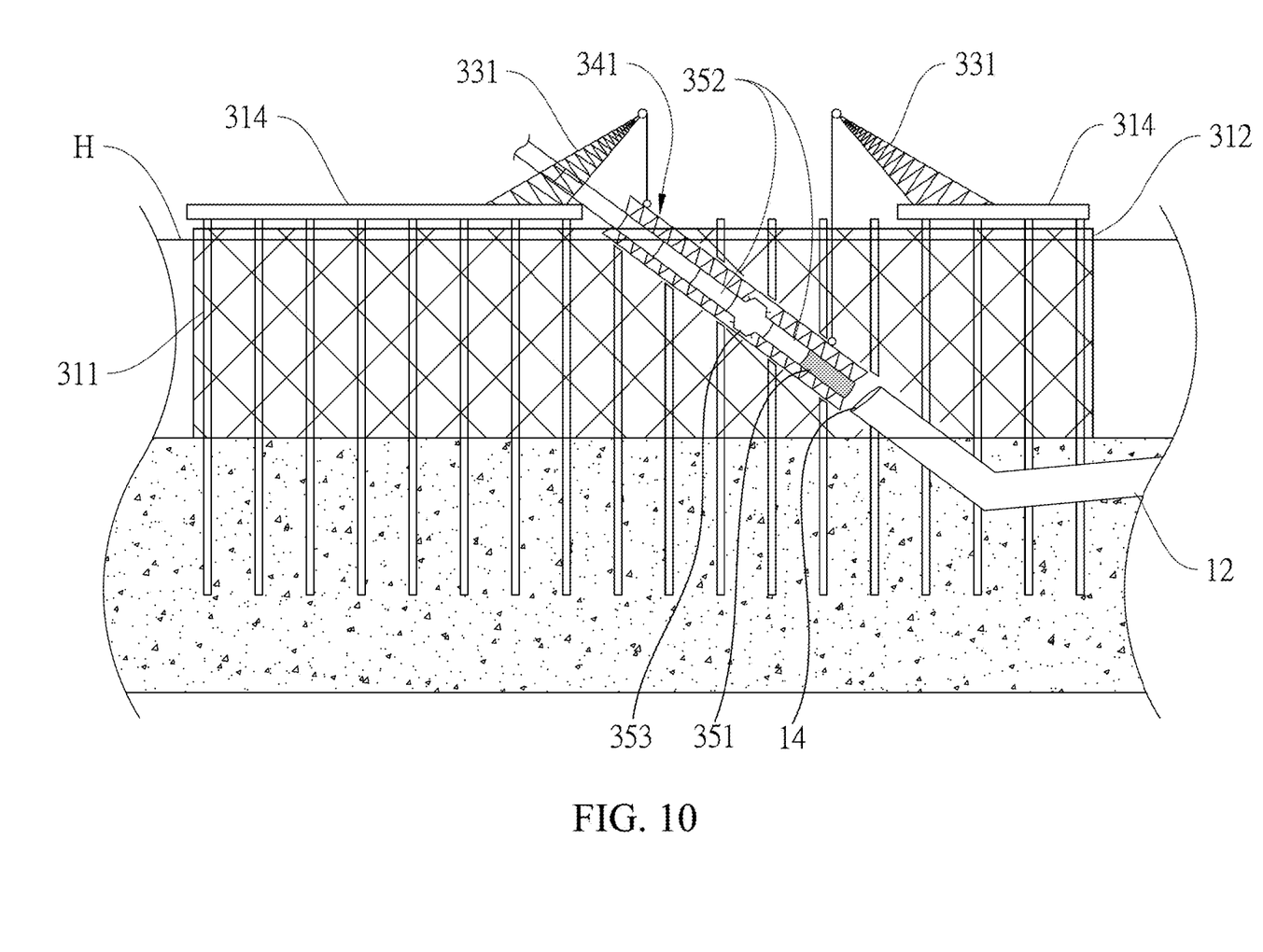
FIG. 10 is a schematic side view illustrating a state in which a reamer is connected between two drill pipes in the guiding step according to a second preferred embodiment of the present invention.
Figure 11:
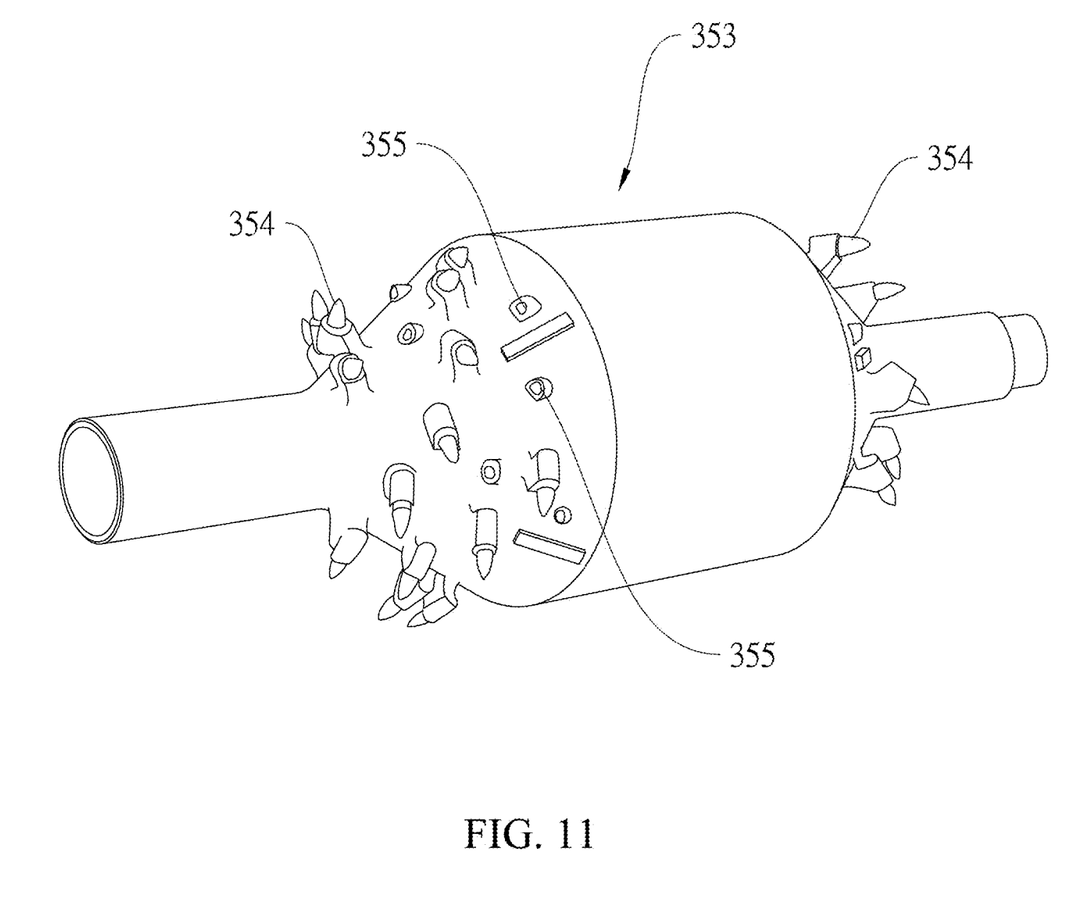
FIG. 11 is a schematic perspective view illustrating a three-dimensional appearance of the reamer.

Please refer to FIGS. 10 and 11, in a second embodiment, a reamer 353 may be provided between two adjacent drill pipes 352, so that the drilling hole diameter can be expanded while drilling the distributing pipe 12. The diameter of the reamer 353 is larger than the diameter of the drill pipe 352 and the drill bit 351, and the reamer 353 is provided with a plurality of drill points 354 to drill through the clogged bulk in the distributing pipe 12 when spinning. The plurality of drill pipes 352 are hollow used to deliver water or solvent from the work platform 314 to the reamer 353, and the reamer 353 is provided with a plurality of outlets 355, so that water or solvent is ejected from the outlets 355 to soften the clogged bulk in the distributing pipe 12.

Figure 13:
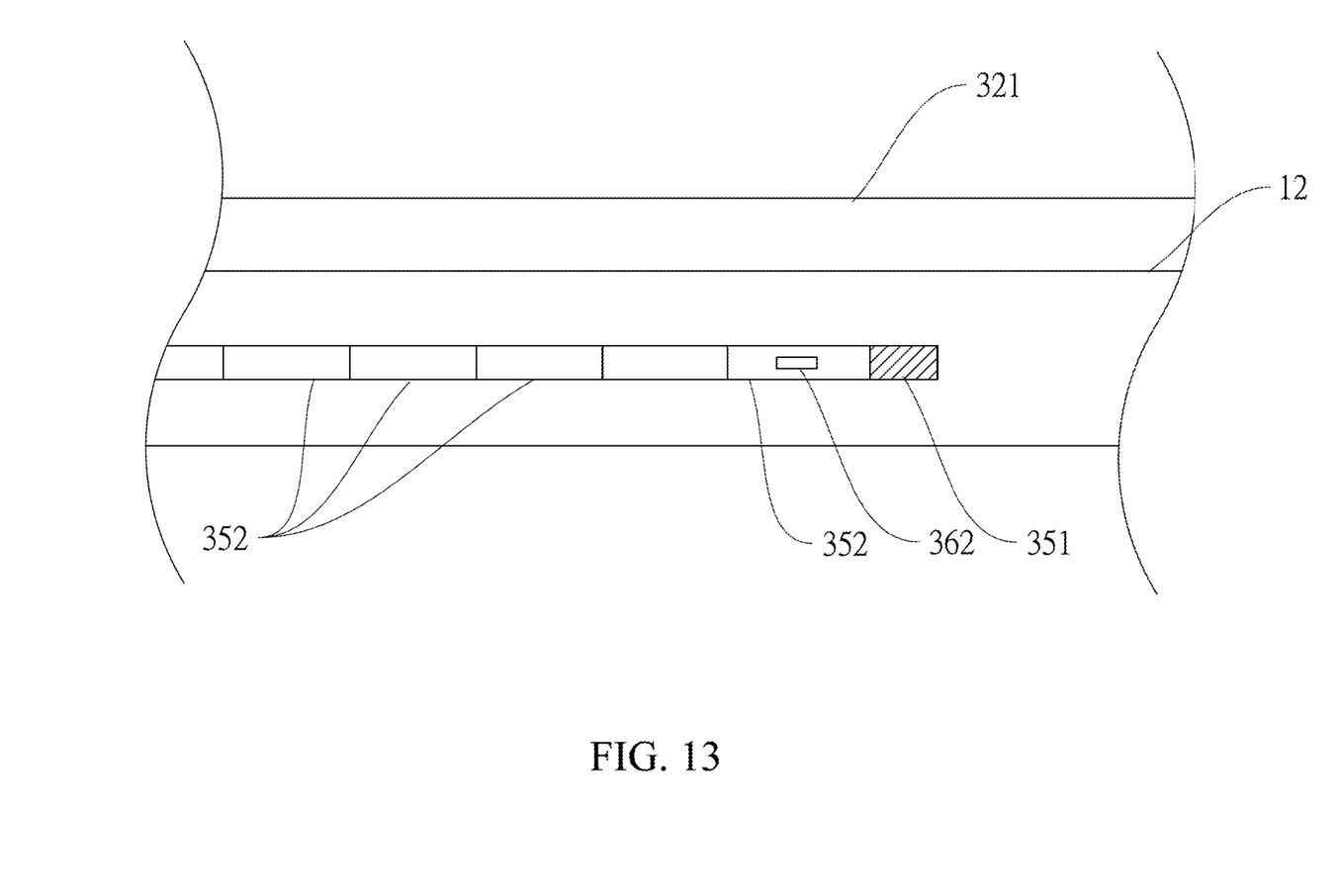
FIG. 13 is a partial cross-sectional side view illustrating a state of the drill bit and a plurality of drill pipes connected in series in the distributing pipe in the drilling step.

Please refer to FIGS. 12 and 13, in the drilling step 907, the drilling equipment 361 is controlled based on the drilling path, and the drill bit 351 is controlled to drill from the opening 14 at the end of the distributing pipe 12 in a direction toward the inside of the conveying pipe 11, and the drilling location of the drill bit 351 is detected by the induction coil assembly 321.

A measuring and detecting transmitting device 362 is provided in the drill pipe 352 connected to the drill bit 351. The induction coil assembly 321 can produce an artificial magnetic field after being powered up. The measuring and detecting transmitting device 362 can detect an artificial magnetic field and a geomagnetic field. The geomagnetic field is the geomagnetism. The measuring and detecting transmitting device 362 can transmit the data in a wireless or wired manner. A drilling position calculation device 363 is provided on the work platform 314. The drilling position calculation device 363 can obtain the detected data transmitted by the measuring and detecting transmitting device 362, and calculates the position of the drill bit 351 and the plurality of drill pipes 352. The drilling position can be displayed on the screen, so the operator can control the position and advancing direction of the drill bit 351 to be consistent with the planned drilling path, which can prevent the drill bit 351 from damaging the distributing pipe 12.

Furthermore, the method that providing an operator with the position of the drill bit 351 obtained by the drilling position calculation device 363 to control the drilling path of the drill bit 351 is Horizontal Directional Drilling (HDD), so it can precisely control the drilling path on the ground under the water surface H to prevent the drill bit 351 from damaging the pipe wall of the distributing pipe 12.

Figure 14:
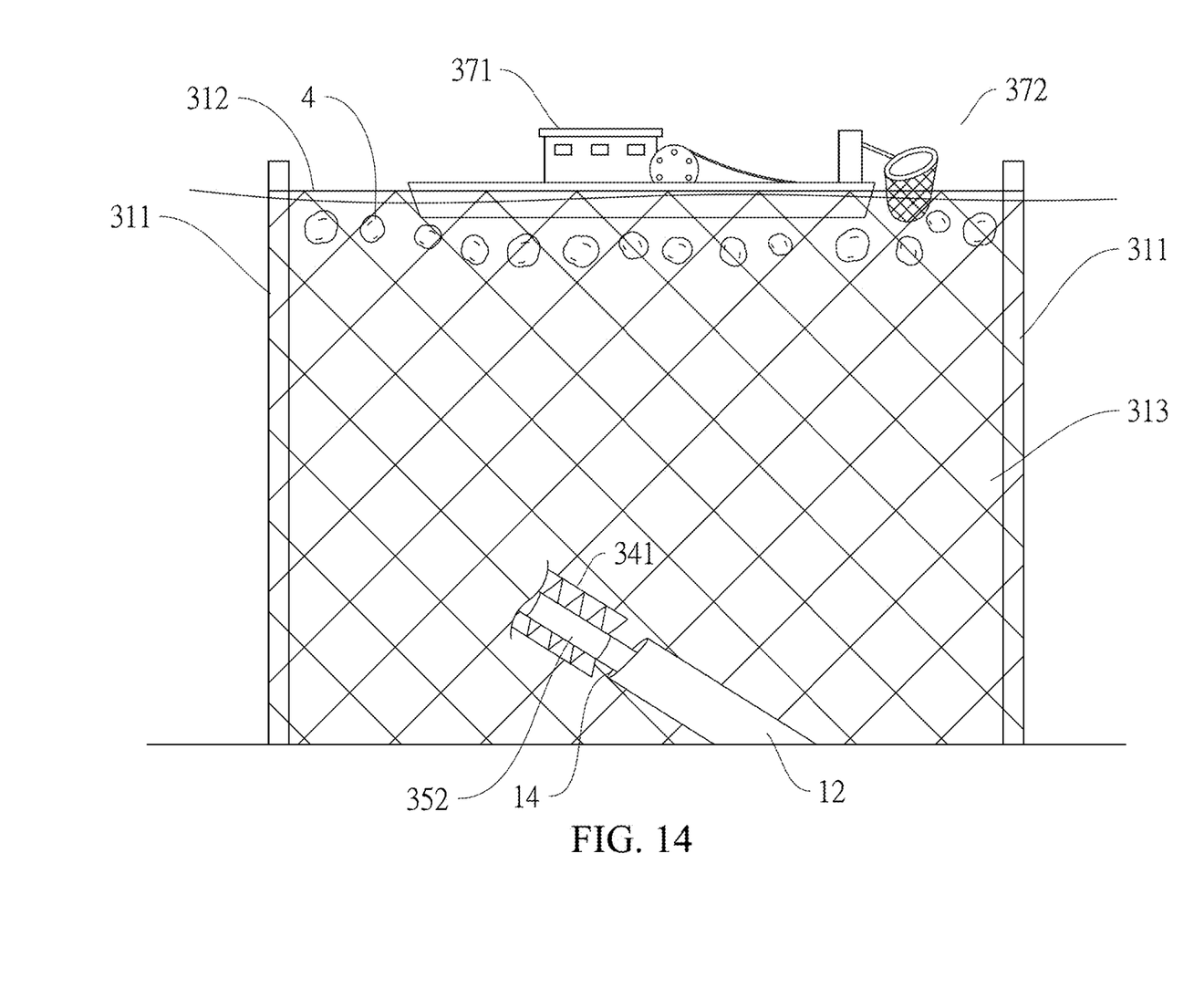
FIG. 14 is a schematic side view illustrating how the waste is removed in a cleaning step.

Please refer to FIG. 14, in the cleaning step 908, the waste 4 generated in the drilling step 907 will be blocked by the netting 312 in the work area 313, which can avoid polluting other water area, and then collect the waste 4.

When the clogged bulk of the distributing pipe 12 is drilled, the waste 4 (such as branches or garbage) will be generated. Lighter items will float on the water surface H. The waste can be encircled by the netting 312 within the work area 313 to prevent the waste 4 from floating to other water area, and the waste 4 floating on the water surface H will be removed. Preferably, the staff can use a net-shaped fishing tool 372 to remove the waste 4 floating on the water surface H. In actual implementation, a small vessel 371 can be used to carry out the removal operation of waste 4 in the work area 313, or set up a pumping equipment and filtering equipment on the work platform 314 to collect the waste 4 floating on the water surface H, underwater or on the underwater ground, and shall not be construed as limiting the invention.

In conclusion, the induction coil assembly 321, the measuring and detecting transmitting device 362, and the drilling position calculation device 363 obtain positions of the drill bit 351 and the plurality of drill pipes 352 using horizontal direction drilling (HDD), so that the operator of the drilling equipment 361 can control the position and advancing direction of the drill bit 351. Meanwhile, it can avoid damaging the wall of the distributing pipe 12, and can remove the clogged bulk in the distributing pipe 12. The netting 312 can block the waste 4 to avoid polluting other water area, and after the distributing pipe 12 is cleaned up, the treated wastewater from the sewage treatment plant 2 can be continuously discharged. Therefore, the aforementioned objective of the present invention can be achieved.

Although the present invention has been explained in relation to its two preferred embodiments, it is to be understood that many other possible modifications and variations can be made without departing from the scope of the invention as hereinafter claimed.

What is claimed is:

1. A method of removing sludge from a sewage treatment plant effluent piping system, wherein the effluent piping system includes a conveying pipe 11 connected to a sewage treatment plant 2, a distributing pipe 12 connected at one end to the conveying pipe 11 and extending along ground beneath a body of water, and a plurality of standpipes 13 disposed at intervals along the length of the distributing pipe 12, the opposing end of the distributing pipe 12 inclined upwardly, exposed above the ground and beneath the surface of the body of water, and including an opening 14, the method comprising the steps of:

driving the ends of a plurality of support columns into the ground beneath the body of water and ceasing the driving while the opposing ends of the support columns are still above the body of the water, the plurality of support columns encircling a work area of the body of water about the opening 14 of the distributing pipe 12;

placing a work platform upon the opposing ends of the support columns that are still above the body of the water;

placing a drilling system including at least a drill bit 351 and a plurality of drill pipes 352, upon the work platform;

positioning the drilling system on the work platform such that the drill bit 351 is capable of passing through opening 14 and passing into distributing pipe 12, the positioning taking into account, a drilling angle, drilling distance, drilling depth, drilling curvature, and a target drilling length distance;

deploying an induction coil assembly above the distributing pipe 12 with a diver or deepwater deployment equipment;

disposing at least two pieces of lifting equipment upon the work platform, the at least two pieces of lifting equipment being capable of together lifting a conveying bracket into and out of the water;

guiding a drill bit from the work platform into the opening 14 at the end of the underwater distributing pipe 12 by engaging the conveying bracket, and each time the drill bit advances a predetermined distance, a piece of drill pipe is connected to the rear of the drill bit;

activating the drilling system, causing waste to exit the distributing pipe;

detecting a position of the drill bit and plurality of drill pipes within the distributing pipe with the induction coil assembly;

controlling the drill bit based on data transmitted as a result of the induction coil assembly; and collecting the waste generated by drilling.

2. The method of removing sludge from a sewage treatment plant effluent piping system of claim 1, further comprising the step of:

encircling the plurality of supporting columns with netting.

3. The method of removing sludge from a sewage treatment plant effluent piping system of claim 1, further comprising the step of:

preventing the waste exiting the distributing pipe from exiting the work area with the netting.

4. The method of removing sludge from a sewage treatment plant effluent piping system of claim 3, further comprising the step of:

removing collected waste from the work area.

5. The method of removing sludge from a sewage treatment plant effluent piping system of claim 4, further comprising the step of:

placing a measuring and detecting and transmitting device in the drill pipe connected to the drill bit, the induction coil assembly producing an artificial magnetic field, the measuring and detecting transmitting device detecting the artificial magnetic field and the geomagnetic field, and transmitting the detected data.

6. The method of removing sludge from a sewage treatment plant effluent piping system of claim 5, further comprising the step of:

placing a drilling position calculation device on the work platform, the drilling position calculation device receives the data transmitted by the measuring and detecting transmitting device, so that the position of the drill bit and the drill pipes may be calculated.

7. The method of removing sludge from a sewage treatment plant effluent piping system of claim 6, wherein the position of the drill bit and drill pipes is obtained by the induction coil assembly, the measuring and detecting transmitting device, and the drilling position calculation device with horizontal direction drilling (HDD).

8. The method of removing sludge from a sewage treatment plant effluent piping system of claim 1, further comprising the step of:

providing a reamer between at least two adjacent drill pipes, the reamer following the drill bit, and expanding a drilling hole diameter as it advances.

9. The method of removing sludge from a sewage treatment plant effluent piping system of claim 8, wherein, the diameter of the reamer is larger than the inner diameter of the drill pipe and the drill bit, and the reamer includes a plurality of drill points to expand the drilling hole diameter when spinning.

10. The method of removing sludge from a sewage treatment plant effluent piping system of claim 8, further comprising the step of:

delivering water or solvent from the work platform to the reamer through the plurality of drill pipes which are hollow, the reamer having a plurality of outlets ejecting the water or solvent through the plurality of outlets to soften any clogged bulk in the distributing pipe.

* * * * *